Patented Sept. 18, 1923.

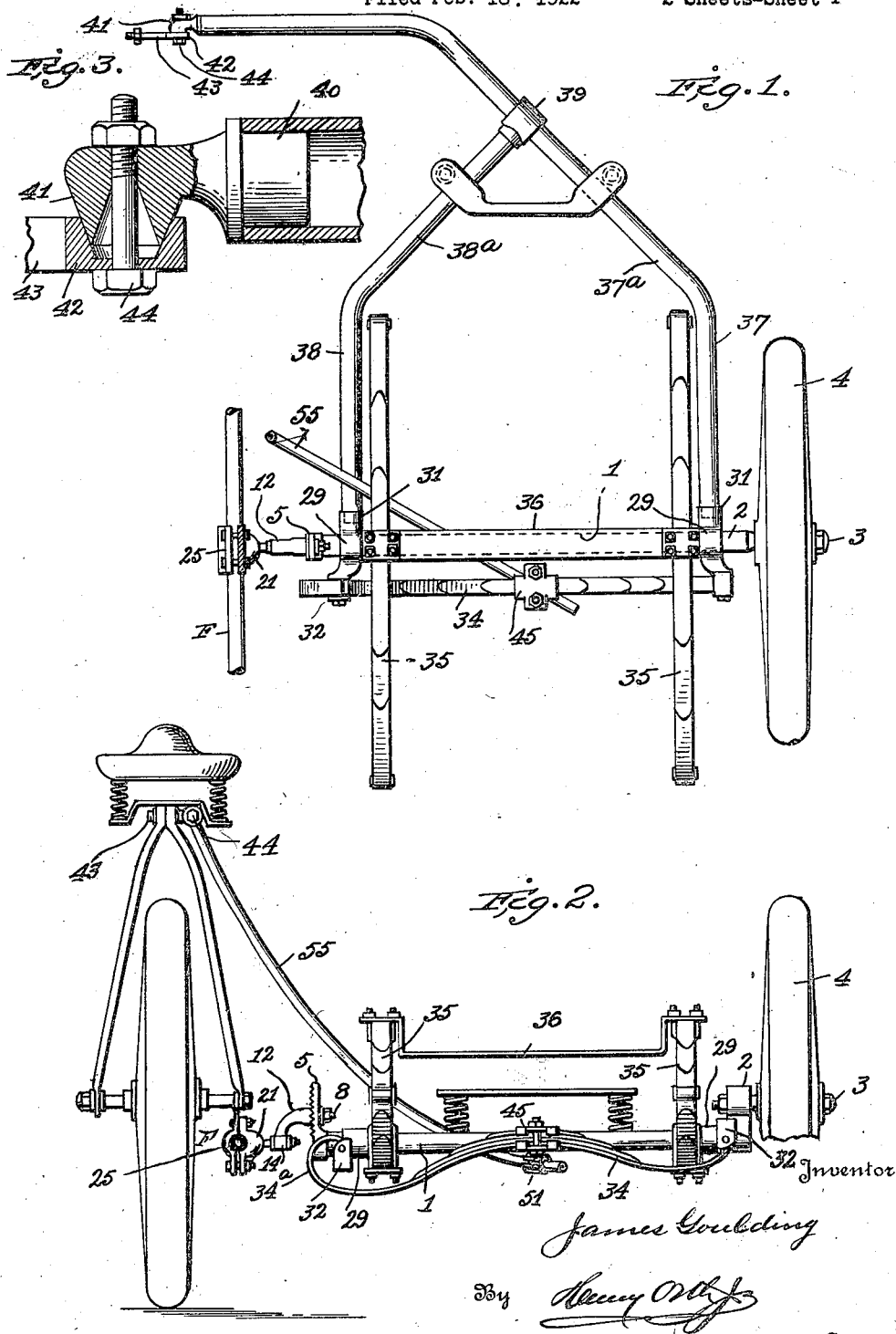

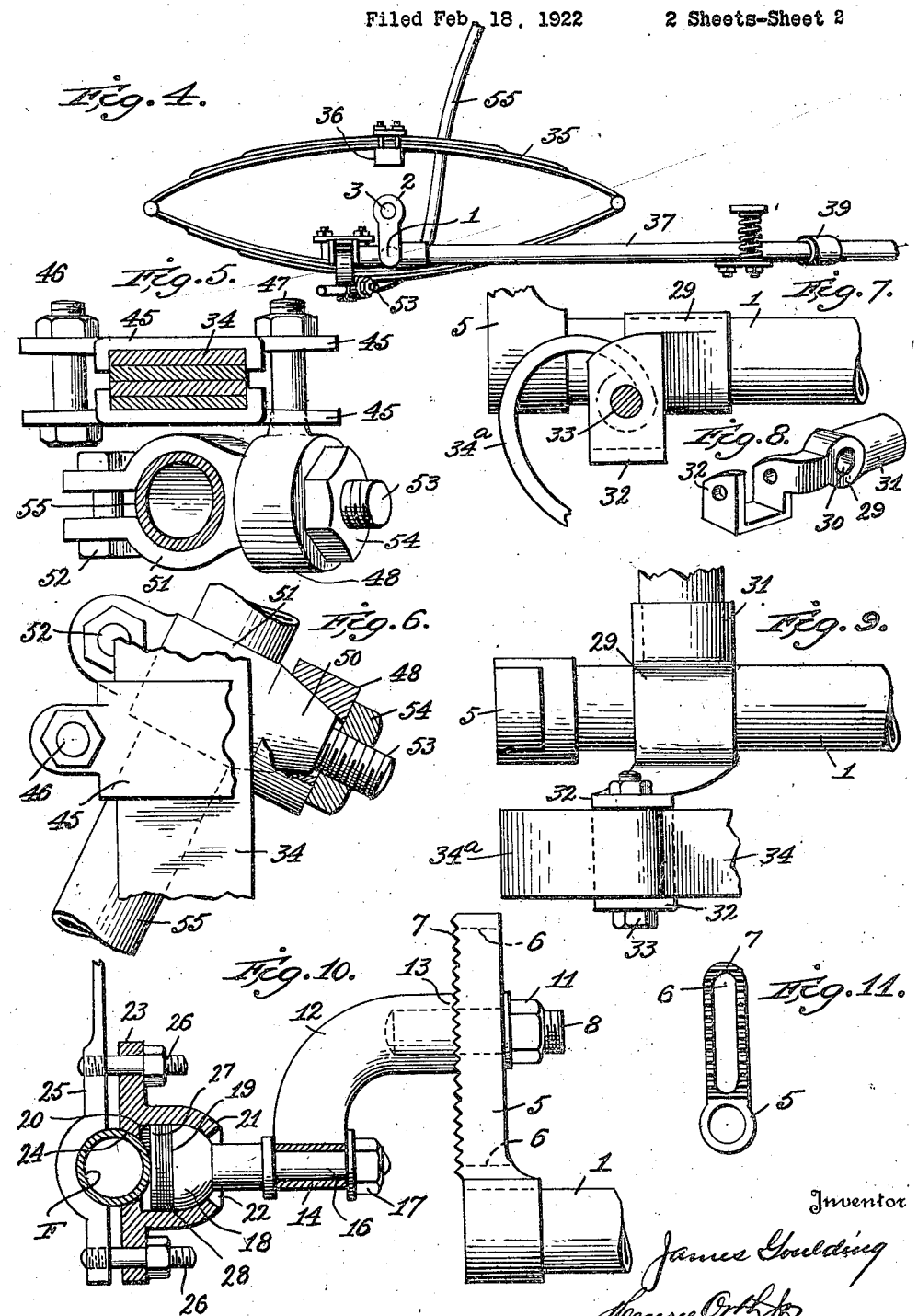

1,468,201

UNITED STATES PATENT OFFICE.

JAMES GOULDING, OF RICHMOND, VICTORIA, AUSTRALIA.

SIDE-CAR CHASSIS.

Application filed February 18, 1922. Serial No. 537,492.

*To all whom it may concern:*

Be it known that I, JAMES GOULDING, a subject of the King of Great Britain, residing at Richmond, State of Victoria, Australia, have invented certain new and useful Improvements in Side-Car Chassis; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to side car chassis for motor cycles and other vehicles, and has for its object to render the riding of the passenger in the side car as free from shocks as possible, and to reduce the tendency to crystallization of the chassis frame members.

It also has for its object to materially reduce the influence of the chassis and side car on the motor cycle, and thus obtain a flexibility which is very attractive to motor cycle riders who are accustomed to riding solo.

The invention includes a novel brace connection with the side car, means for adjusting the axle to compensate for differences in diameter due to sizes of tires different from those furnished with the side car, and other features of construction, as will be hereinafter described in detail and claimed, all of which tend to make the riding of passenger or driver or both more comfortable.

Referring to the drawings, in which like parts are similarly designated—

Figure 1 is a plan view of the chassis.

Fig. 2 is a rear elevation.

Fig. 3 is a section of the connection at the end of the forward bar for the front end of the cycle.

Fig. 4 is a side elevation of the chassis.

Figs. 5 and 6 are enlarged detail views of the connection for the brace with the spring.

Figs. 7, 8 and 9 are detail views of the fitting for supporting the spring ends.

Figs. 10 and 11 are detail views of the connection between the chassis and cycle frame at the rear.

The chassis consists of an axle 1 of the drop type carrying at the wheel end the vertical spindle support 2 for the stub-spindle 3 of the wheel 4 of the chassis.

At the opposite end of the axle 1 is an upstanding bracket 5 having a longitudinal slot 6 and a transversely serrated face 7. Passing through the slot 6 is a bolt 8 (Fig. 10) provided with a nut 11. This bolt is secured in one end of an arcuate fitting 12 that is also provided with transverse serrations 13 for co-acting with those 7 on the bracket 5.

The opposite end of this arcuate fitting is formed as a bearing 14 for the reception of one end of a spindle 16. The bearing is held on the spindle by a nut 17. On the opposite end the spindle has a hemisperical bearing member 18 having a flat or nearly flat face 19. The bearing member 18 seats in a cylindrical socket 20 terminating in a hemispherical end 21 having a perforation 22, as shown.

The socket is formed on a clamping plate 23 that has a recess or other groove 24 which enters the socket so that the frame member F is exposed within the socket. A companion grooved clamping plate 25 cooperates with plate 23 to clamp member F between them by bolts 26.

Within the socket is a steel disc 27 resting directly on the frame member F and interposed between it and the face 19 are several leather or other resilient discs or washers 28.

At each end of the axle (Figs. 7-9) is a drop-forging 29 through which the axle passes and is brazed thereto.

This fitting has a transverse bore 30 for the axle, a socket at 31 at right angles thereto, for a longitudinal member of the chassis, and at the rear a bracket 32 in which is a spring holding bolt 33.

There is one of these fittings 29 at each end of the axle, Figs. 1 and 2, the one at the wheel end of the axle being reversed with respect to the one at the opposite end of the axle.

A spring 34 is mounted at its opposite ends in the brackets 32, and that end 34ᵃ of the spring adjacent the cycle is curled—that is to say the end of the spring is formed as a flat spiral, thereby dispensing with a shackle.

Connected to the axle are two full elliptic springs 35 for supporting the side car body (not shown) and extending between these two springs and secured thereto directly over the axle or slightly to the front thereof, as the manufacturer may elect, is the supporting bar 36, for the body.

One end of each of the two side members 37 and 38 of the chassis is brazed into its corresponding socket 31, Fig. 1, of the fitting 29. These side members 37 and 38 are bent toward one another at 37$^a$ and 38$^a$ and the one 38$^a$ connected by a brazed fitting 39 to the one 37$^a$, thus forming with the axle a pentagonal frame. One of the two sides 37, 37$^a$ is extended beyond the fitting 39 and forms the forward bar of the frame, carrying at its end a connection for attachment to the front end of the cycle frame. This connection is shown in detail in Fig. 3, and comprises a plug portion 40 having a conical lug 41 fitting into a conically recessed head 42 on a bolt 43. A bolt 44 passes through the head 42 and lug 41, as shown.

Connected at or about the middle of the leaf spring 34 are a pair of clamping plates 45 secured by bolts 46 and 47, Figs. 5 and 6. The bolt 47 has a head 48 having a conical recess for the reception of a conical lug 50 on a split sleeve 51 having a clamping bolt 52. The lug 50 carries a stud 53 that is fastened to the head 48 by a nut 54.

The brace 55 that is usually present in all side car chassis is connected at its upper end to the saddle post cluster of the cycle frame, as usual.

According to my invention the lower end of this brace passes through the split sleeve 51 and the elements 45 to 54 constitute a fitting by which the lower end of the brace is adjustably connected to the spring 34.

By loosening the split sleeve 51 the lower end of the brace 55 may be passed through the sleeve to a greater or less extent, to vary the effective length of this brace and thereby adjust the inclination of the cycle with respect to the chassis.

The leaf spring 34 which extends between the side members 37 and 38 in a great measure takes some of the strains tending to crystallize the side members of the chassis and the axles, and also prevents shocks from being transmitted to the cycle frame through the brace and vice versa. In order that this action may be attained it is necessary that the ends of the spring be directly connected and no shackle be used as is customary in prior spring constructions.

The connection represented by the elements 17—28 for connecting the axle to the rear portion of the cycle frame provides limited universal movement at this point, the leather washers 28 enabling a certain amount of movement. In other words the universal movement of the hemisphere 18 is restrained or retarded.

The axle 1 may be raised or lowered by adjustment of bracket 5 up or down with respect to the arcuate member 12, thus compensating for any set that the body springs may attain during use, and especially to afford compensation for the use of different sized tires and for adjustment to different types of cycle frames.

The hinge connection at the front permits vertical movement of the side car wheel without communicating this movement to the cycle frame.

I have found that these connections, front and rear, permit exceptionally free movement of the side car and cycle without transmission thereof unduly from one to the other, while the spring 34 takes up these movements with respect to the brace so well, that but little difference is noticeable in riding with side car attached over riding solo.

The axle and side members of the chassis are of commercial tubing.

I claim,—

1. In a side car chassis, the combination with a pair of longitudinal chassis members; of a leaf spring extending between and supported by the longitudinal members and a brace connected at one end to the spring and its opposite end arranged for connection to a cycle at the saddle bar cluster.

2. In a side car chassis, the combination with a pair of longitudinal chassis members; of a leaf spring connected between the two members, a brace, means to adjustably connect one end of said brace to said spring and means for connecting the brace at its opposite end to a cycle at the saddle.

3. In a side car chassis, the combination with a chassis having longitudinal members; of a leaf spring extending substantially transversely of the chassis, a brace, means to adjustably connect the brace and spring and means for connecting the brace to a cycle.

4. In a side car chassis the combination with an axle, a leaf spring arranged substantially parallel to said axle, a brace independent of the axle and connected to said leaf spring between the ends of the latter, said brace arranged to pass beneath the side car body for connecting to a cycle.

5. In a side car chassis, the combination with the axle thereof; of a leaf spring substantially parallel to said axle and behind the same, a brace, means to connect the brace to said spring, means for connecting the brace to a cycle frame and means to change the effective length of the brace.

6. In a side car chassis the combination with longitudinal chassis members and an axle member extending transversely of said members which project to the rear of said axle member, a leaf spring having a flat spiral portion or curl at one end, the ends of said spring secured to said projecting portions of the longitudinal chassis members and a brace connected between the ends of said spring whose other end is arranged for connection to a cycle frame.

7. In a side car chassis, an axle for the chassis, means to connect the chassis to a cycle frame including resilient means to permit restrained universal movement at the point of connection and a separate bearing parallel to said axle and between said connection and axle to permit the chassis to rock thereon.

8. In a side car chassis, an axle for the latter, a universal joint connected to the cycle frame, resilient means to restrain the movements of the joint, and an adjustable connection between the joint and axle.

9. In a side car chassis, the combination with the axle thereof; of a leaf spring arranged substantially parallel to said axle and having its opposite ends directly connected to the chassis, one of the ends of the spring being curled and adjacent the cycle side of the chassis, and a brace adjustably connected at its lower end to said spring and at its upper end arranged for connection with a cycle frame.

10. The combination with a cycle frame member and a side car axle; of a slotted bracket on the end of said axle, a fitting for connection to the cycle frame member comprising a pair of clamping plates having grooves on their clamping faces, one of said plates having a semi-spherical socket, a semi-spherical head in said socket, washers for interposition between the member and head, said head having a stem projecting through the socket and a connecting member on said stem terminating in a bolt passing through the slot in said bracket.

11. In a side car chassis, an axle having an upwardly extending longitudinally slotted bracket, an arcuate connecting member having a bolt at one end fastening in the slot of said bracket and a sleeve at its other end, a hemi-spherical head having a stem rotatable in said sleeve, a socket member in which said head operates, said socket member having flanges forming a plate that has a transverse cylindrical groove and a clamping plate having a like groove, said grooves arranged to co-operate with a cycle frame member.

12. In a side car chassis, the combination with a pair of longitudinal chassis members, an axle, a leaf spring connected with the two members and arranged substantially parallel to the axle, a brace, a clamp on said spring, and a vertical pivot connecting said brace and clamp.

13. In a side car chassis, the combination with a leaf spring; of a brace, a clamping plate on each side of the spring and bolts passing through said clamps, one of said bolts securing the end of said brace, whereby the effective length of said brace may be readily adjusted at the rear of the chassis.

In testimony that I claim the foregoing as my invention, I have signed my name.

JAMES GOULDING.